UNITED STATES PATENT OFFICE 2,562,630

NUT BUTTER MANUFACTURE

Paul J. Mitchell, Jr., Griffin, Ga.

No Drawing. Application July 15, 1949,
Serial No. 105,053

21 Claims. (Cl. 99—128)

This invention relates to the manufacture of nut butters. More particularly the invention relates to the manufacture of nut butters which are stabilized against oil separation, and which are characterized by superior spreadability.

It is known that nut butters consisting of a mixture of solid nut particles and nut oils may be prepared by grinding the kernels of edible nuts such as peanuts. The solid and liquid constituents of such butters tend to separate on standing, the nut oils present forming a layer on top of solid matter. As the consumer gradually removes the butter from the container, the butter becomes progressively more stiff, dry, and unpalatable due to progressive removal of a disproportionate amount of the original natural oil from the top layer.

Stability against oil separation has been achieved by adding about 0.75–1% by weight of highly hydrogenated fats (hard stock) in a liquid state to the hot nut butter. One stabilizing material conventionally employed is a fluid mixture of substantially completely hydrogenated vegetable oil and an unsaturated oil of lower melting point. For example a mixture of hydrogenated and natural peanut oil may be utilized to stabilize peanut butter.

These hydrogenated fat stabilizing agents function by forming in the nut butter, a network of interlacing crystals which effectively precludes migration of the solid nut and nut oil particles and thus prevents separation of the butter into two distinct phases.

The addition of stabilizer under conditions now employed commercially serves to immobilize liquid oil and prevent separation but it does so at the cost of decreasing spreadability and flavor. The hard fat employed as a stabilizer tends to give a stiff product and one which has a waxy flavor. When eaten the butter tends to cling to the palate. As a consequence the minimum amount of stabilizer that will be effective is added.

The usual practice is to mix the stabilizer with the butter at the time it is ground. At this time the butter is at a temperature of about 150–180° F. due to the friction of the grinding. The hot butter is then packaged usually in glass jars, placed in cases which are stored in piles to cool. Cooling is allowed to take place spontaneously and the rate varies greatly depending upon the number of cases in the piles, the degree of air circulation, outside temperatures, the position of the jars in the case and the position of the cases in the stack. Thus crystal interlacing occurs while the butter is quiescent. Under these conditions and the proportions of stabilizers now employed, the nut butter must not be agitated or the crystal lattice is broken down and the effect of the stabilizing agent is permanently defeated. Consequently the use of cooling methods wherein the butter is cooled prior to packaging to a temperature below the crystallization point of the hard stock have not been adopted.

As previously stated, larger proportions of stabilizing agents are not employed because of the observed adverse effect on flavor and spreadability and the danger of producing a stiff undesirable product.

The stabilizing effect depends to a large extent upon the crystal form which the hard stock takes upon cooling.

Hydrogenated fats such as hydrogenated peanut oil presently used as stabilizing agents crystallize under appropriate conditions in three polymorphic forms known to the art as alpha, beta prime and beta forms.

The alpha crystalline form is the least stable, least dense, and lowest melting of the three polymorphs. The X-ray diffraction pattern of this type of crystal is characterized by a single short spacing at 4.14 angstrom units indicative of hexagonal arrangement of long chain axes in the crystals. The microscopic appearance of this form of hydrogenated fat is translucent. Alpha type crystals are converted by heat to the beta prime and beta forms.

The beta prime form of hydrogenated fat crystal is intermediate between the other two polymorphs in stability, density and melting point. The X-ray diffraction pattern of beta prime fat crystals is typified by two short spacings, one at 4.18 angstrom units and one at 3.78 angstrom units. Beta prime type crystals are characterized by a high length-to-breadth ratio and thus are capable of forming an interlaced network whereby large proportions of oil may be immobilized. Beta prime type crystals are heat convertible to the beta form.

The beta form is the most stable, most dense, highest melting and most opaque of the three polymorphic forms of hard fat crystals. The X-ray diffraction pattern of this type of crystal is characterized by prominent multiple short spacings at 4.61, 3.84 and 3.68 angstrom units and by a less prominent short spacing at 5.3 angstrom units. Beta type crystals have a low length-to-breadth ratio and hence are not good stabilizers for immobilizing liquid oil.

As will be apparent from the foregoing discussion, the crystalline form assumed by the hard stock will depend to a large extent upon the temperature and time relationship. Thus if the temperature remains too high, namely within the range at which the beta form predominates, considerable stability is lost because the shape of the beta crystals is not suitable for immobilizing the liquid oils at least in the proportions in which the hard stock is used in the butter. If the temperature decreases rapidly enough so that the alpha and beta prime crystals are formed, the butter will be stabilized.

Under the unavoidable conditions of cooling that are now employed it becomes apparent that the rate of cooling will vary to a large extent not only from day to day because of atmospheric temperature variations, but also between the packages on the outside and in the center of the stacks and between the containers near the outside of the carton and nearer the center.

As a consequence the butter in certain containers may be perfectly stabilized, while that in other containers may be soft and pasty and accompanied by oil separation. Others may be hard and grainy with poor spreading properties even though no oil separation occurs.

This has presented a perplexing and difficult problem to the art.

Nut butter containing the stabilizer must be rapidly and uniformly cooled from the temperature at which the stabilizing agent is liquid to a temperature below that at which beta type crystals are predominantly formed. The temperature at which predominantly beta type crystals separate from oil solution will vary depending upon the ratio of hard stock to released oil in the butter. As a rule this released oil is about 10–15% of the total butter.

Conventionally, as stated above, nut butter packages are packed while hot into cases which are in turn placed in stacks. If some of the packages remain for a long period of time at about the beta crystallization temperature for a given hard stock to oil ratio, the stabilizing agent is deposited predominantly in the beta form, and the nut butter not properly stabilized. This results in a soupy butter from which oil separates. Because of favorable cooling conditions the butter in other packages may be properly stabilized. The undesirability of such non-uniformity is obvious. To supply cooling means adequate to overcome this problem is uneconomical. Moreover such cooling must be closely controlled for satisfactory results.

The nut butter industry is thus faced with a dilemma. Uniform, rapid cooling of the hot butter to a temperature below the beta crystallization temperature is essential for stabilizing against oil separation.

I have discovered that a nut butter of excellent spreadability, which is stable at high temperatures and which is stable against oil separation, may be produced by dispersing in hot nut butter a melted hydrogenated fat, in an amount at least equal to from about 1.5 to about 5% by weight of the nut butter, rapidly cooling the dispersion to obtain crystallization of the hydrogenated fat predominantly in the alpha and beta prime form, agitating the dispersion, putting the butter into containers and allowing it to stand at a temperature below the beta crystallization temperature.

The cooling and agitation may be terminated either at a temperature above that at which the hydrogenated fat will crystallize predominantly in the beta form or at a temperature below that at which the hydrogenated fat will crystallize predominantly in the beta form. In some instances it is desirable to cool and agitate the nut butter composition at a temperature below that at which the hydrogenated fat will crystallize in the beta prime form thus effecting initially the formation predominantly of alpha type hydrogenated fat crystals.

The agitation may be effected simultaneously with the rapid cooling of the nut butter or subsequently thereto.

It is critical and essential to the process of this invention however that the agitation and rapid cooling of the nut butter not be terminated when the nut butter is within the temperature range in which the hydrogenated fat will crystallize predominantly in the beta form.

If this limitation is not observed a soupy, unstable and undesirable product is obtained.

As previously indicated the specific temperature at which the hydrogenated fat stabilizing agent will crystallize in a particular polymorphic form is not susceptible of accurate prediction.

In the temperature range of from 100° F. to 115° F. the factors favoring crystallization in the beta form are most pronounced in effect. Hence accurate control when operating in this temperature range is essential. Consequently it may be necessary to determine experimentally the permissible temperature limits for any particular grind, when the cooling and agitation is to be terminated in this temperature range.

In general, however, when the quantities of hydrogenated fat stabilizing agent specified herein are utilized the rapid cooling and agitation may be terminated at a temperature either within the range of from about 115° F. to about 120° F. which is above the beta crystallization temperature or within the range of from about 65° F. to about 100° F. which is below the beta crystallization temperature.

The alternative of terminating the rapid cooling and agitation at a temperature below that at which the hydrogenated fat crystallizes predominantly in the beta form is preferred as a firm product of maximum spreadability and smoothness is thereby produced. A preferred temperature for operation in this manner is from 90° F. to 100° F.

Cessation of the rapid cooling and agitation of the nut butter at a temperature above that at which the hydrogenated fat will crystallize predominantly in the beta form results in a product superior in spreadability to that resultant from conventional methods. The agitation and cooling should not be terminated at a temperature in excess of 120° F., however, for the reason that the product obtained although stable to oil separation will demonstrate impaired spreadability ostensibly as a consequence of the formation of long interlaced crystal networks.

Rapid cooling for purposes of this invention refers to the rate of cooling from the temperature at which the hard stock is molten, to the temperature at which beta prime or alpha crystals are predominantly obtained, with little or no beta formation. It is necessary that the butter be supercooled through the range at which beta crystals would form if the butter is to be cooled to and agitated at a temperature below the beta formation temperature. In general the butter is cooled from the temperature of the grind (150–180° F.) to the desired point either above or below the beta formation temperature in less than 10 minutes and usually within 1 to 5 minutes.

When first produced by the process of this invention the nut butter has a semi-fluid character which tends to flow when, for example, a freshly filled jar is inverted. At this stage it can be packaged by conventional filling machines, flowing readily into the containers. Within a short period of standing the butter becomes firm. The lower the temperature at which the semi-fluid butter is packed, the more rapidly it becomes firm. For example, at about 72° F. it requires only a few minutes. At 100° F. the time is somewhat longer. For maximum efficiency and control it is preferred that the process be continuous and uninterrupted between the cooling and agitating stage and the packing out. It is also preferred that after packing out, the butter not be disturbed. Normal handling operation for containers can be carried out without harming the butter.

It is essential to the process of this invention that there be dispersed in the nut butter an amount at least equal to from about 1½% to about 5% of the weight thereof of a hydrogenated fat stabilizing agent. A preferred range of minimum concentration of the stabilizing agent is from about 3.0% to about 4% by weight of the nut butter.

The optimum amount of stabilizing agent which should be utilized in a particular instance will depend upon the amount of unsaturated oil present, and the amount of oil released by grinding, but will normally fall within the above defined ranges. The particle size is an important factor. The invention is particularly adaptable to finely ground butters, wherein, for example, 95% passes 200 mesh. However, it produces improved products from more coarsely or finely ground butters.

Just what occurs in the butter to accomplish this result obtained by this invention is not known with absolute certainty.

It appears however that by rapidly cooling and agitating the nut butter to a temperature slightly above that at which the hydrogenated fat would normally crystallize in the beta form, the fat becomes somewhat supercooled, and alpha and beta prime crystals are predominantly formed. Furthermore this result obtains although the nut butter is cooled somewhat more slowly through the temperature range at which beta type crystals would normally be produced. Ostensibly nuclei of alpha and beta prime crystals are formed in the hydrogenated fat during the rapid cooling step and lead to the above described result.

Likewise it may be that the agitation during or subsequent to the cooling of the nut butter breaks down or precludes the formation of long, strongly interlaced alpha and beta prime crystals but induces short crystals and weak interlacing with the result that the hydrogenated fat upon standing develops a crystal network adequate to stabilize the nut butter against oil separation and to impart the desired spreadability characteristics but inadequate to result in a hard butter of poor spreadability. It is to be understood however that it is not my intention to be bound by theory in any respect.

When conventional stabilizing compositions which contain in addition to a hydrogenated fat significant amounts of unsaturated oils, are employed, adequate quantities thereof must of course be utilized to provide the aforementioned quantities of stabilizing agents. Thus if peanut butter is to be stabilized with a mixture containing fifty percent of hydrogenated and fifty percent of natural refined peanut oil, the mixture should be utilized in an amount at least equal to from about 3% to about 10% of the weight of the peanut butter, and preferably in an amount equal to from about 6% to about 8% of the weight of the peanut butter.

The upper limit of concentration of hydrogenated fat stabilizing agent is not critical to the production of peanut butter of the desired physical properties. However, the use of hydrogenated fat in excess of about 5% by weight of the peanut butter is generally unnecessary except for special purposes.

For example, I can produce a highly spreadable butter which is sufficiently firm to be dispensed in non-rigid containers, whereas the products described above are sold in glass jars, cans and the like. The butter to be dispensed in non-rigid containers is stabilized with about 3 to 6% of hard stock and preferably 4 to 5%. This dispersion is rapidly cooled to a temperature of about 65° F. to about 90° F. and preferably from about 70° to about 80° F. It is immediately, while still fluid, packed into a flexible container such as a corrugated boat, ice cream carton and the like. The temperature of the butter compaction is then raised to about 100° to about 110° F. The fluid butter quickly becomes firm, but does not lose its spreadability. It can be handled for wrapping, packing cartons and the like. The same effect is obtained at temperatures of 80–100° F. but the rate of firming is less rapid.

For example, the material made in this way can be packed in quarter pound containers such as are used for margarine, cheese, dairy butter and the like. These can be unwrapped and served in the same fashion as dairy butter now is, either as a stick, or cut into squares, etc. This is an advantage over conventional nut butters, which if firm enough to hold their shape have poor spreadability.

The products made by this modification of my invention are as readily spreadable as margarines or dairy butter.

The slight waxy flavor imparted to the nut butter by the use of quantities of stabilizing agents in proportions above 3% can be obviated by addition to the nut butter of a small quantity of oil-soluble artificial butter flavor such as one of those used in dairy butter and margarine. Preferably such artificial flavor is added in an amount equal to from about 0.1% to about 0.2% of the weight of the nut butter. This may be added together with the stabilizer.

Any normally solid edible substantially saturated triglyceride hydrogenated fat either natural or synthetic may be utilized in the process of this invention. It is preferred, however, that the fat be at least 70% hydrogenated.

Exemplary of hydrogenated natural fats which may be so utilized are substantially completely hydrogenated peanut oil, lard oil, olive oil, corn oil, cottonseed oil, sunflower seed oil, linseed oil, hazelnut oil, palm oil, whale oil, fish oil, tallow and the like. Exemplary of synthetically produced fats which may be utilized are hydrogenated tri-stearin, tri-olein, tri-palmitin, stearo dipalmitin, oleo-distearin, and the like.

As previously mentioned these hydrogenated fat stabilizing agents are normally employed in conjunction with unsaturated liquid fats of lower melting point. Unsaturated fats which may be employed for this purpose are, among others, the unsaturated or unhydrogenated forms of any of the aforementioned naturally occurring or synthetically produced fatty oils.

There may be incorporated into the nut butter by the agitation step a significant amount of entrained air. The presence of such air is not undesirable and in many instances improves the quality of the final product. The incorporation of entrained air in an amount equal to from about 5% to about 15% by volume of the nut butter is particularly desirable.

The process of this invention may be utilized in the production of any type of nut or seed butter or other compositions in which hydrogenated fat stabilizing agents are utilized as they are in nut and seed butters. It is particularly suitable however for the manufacture of peanut butter of superior quality. Nut butters produced in accordance with this invention are stable at temperatures of about 100° F., are stable to oil separation and demonstrate excellent spreadability and taste.

The following examples are offered as specific embodiments of this invention.

EXAMPLE I

To 500 grams of finely ground (less than 200 mesh) peanut butter were added 5 grams of salt, 0.5 gram of oil soluble butter flavor and 22.5 grams of a stabilizing composition containing 50% by weight of hydrogenated peanut oil. The resultant mixture was heated to 160° F. to insure melting of all of the hydrogenated peanut oil, mixed well, and cooled to about 70° F. in a period of about 30 minutes.

The cooled mixture then was agitated to disrupt any interlacing of stabilizing agent crystals. A semi-fluid mass was thus produced which was immediately packed in a glass container.

When examined four months after packing the nut butter was found to be in a semi-firm state, stable against oil separation and characterized by excellent taste and spreading properties. This exceeds the normal period between production and consumption of peanut butter.

It is to be noted that there was added to the nut butter of this example hydrogenated peanut oil stabilizer in an amount equal to 2.25% of the weight of the nut butter.

EXAMPLE II

To 325 grams of peanut butter containing ten percent by weight of nut particles larger than 200 mesh were added 3.25 grams of salt, 0.4 gram of oil soluble butter flavor and 26 grams of the same stabilizing composition as that described in Example I. Thus there was added hydrogenated peanut oil stabilizing agent in an amount equal to 4% of the weight of nut butter.

The mixture so obtained was heated, mixed, cooled and agitated in the same manner as that described in Example I.

The semi-liquid product resultant from the agitation step was packed immediately into glass containers and sealed. The sample was examined after one week and after four months and found to be characterized by excellent spreading properties, and demonstrated no oil separation.

EXAMPLE III

To 340 grams of finely ground peanut butter were added 3.5 grams of salt, 0.4 gram of oil soluble butter flavor and 27 grams of the stabilizing composition described in Example I. Thus 13.5 grams or an amount equal to about 4% of the weight of the peanut butter, of hydrogenated peanut oil stabilizing agent were utilized.

The mixture so obtained was heated to a temperature of about 150° F. and mixed well. The receptacle containing the mixture was then placed in a water bath maintained at 70° F. The peanut butter was then slowly but thoroughly agitated as it cooled, care being taken continually to remove all the chilled butter from sides of the receptacle, and mix it with the balance of the material.

This agitation and mixing was continued for a period of about 10 minutes until the nut butter reached a temperature of about 93° F., at which point the agitation was stopped. When the temperature of the product had reached about 90° F. it was placed in the form of a semi-fluid mass into a glass container and sealed.

One week later the peanut butter was found to be in a semi-firm condition, and characterized by excellent spreading qualities. No appreciable further increase in viscosity was apparent four months later.

EXAMPLE IV

To 330 grams of finely ground peanut butter were added 3.3 grams of salt, 0.4 gram of oil soluble butter flavor, and 14.6 grams of the stabilizing composition described in Example I. Thus 7.3 grams or an amount equal to about 2.5% of the weight of the peanut butter of hydrogenated peanut oil stabilizing agent was utilized.

The mixture so obtained heated to 160° F. was mixed well, and cooled to 110° F. in a period of about 10 minutes. Agitation of the mixture was initiated at 110° F. and continued for about 3 minutes until the temperature of the mixture fell to about 100° F. A semi-fluid product was obtained which was packed immediately into glass containers.

One week later the peanut butter was found to be in a semi-firm condition and to have excellent spreading qualities. Upon examination four months later the product was found to be semi-firm, and to be characterized by superior spreadability, and no oil separation.

EXAMPLE V

The procedure described in Example IV was repeated exactly, with the exception that the agitation was initiated and completed while the peanut butter mixture was at a temperature of 110° F.

The product so obtained was found to be semi-firm, and to have excellent spreading properties one week after packaging. Examination four months later revealed that the product had excellent spreading properties.

In Examples IV and V above cooling and agitation of the samples were stopped in the range 110° to 100° F. As shown this produced excellent results, however, it is important that the samples not be held too long nor agitated too vigorously in this temperature range because to do so can cause instability in the product. The above samples were agitated for a time sufficient to destroy the interlacing but not to effect stability.

The following Examples VI to IX illustrate the effect of excessive agitation, of holding the product at a constant temperature, for short periods of time, and of slow cooling in the temperature range of 100° F. to 110° F.

EXAMPLE VI

To 500 grams of finely ground (less than 200 mesh) peanut butter were added 5 grams of salt, 0.75 gram oil soluble butter flavor and 30.5 grams of the stabilizing composition described in Example I. The resultant mixture was heated to 160° F., mixed well, cooled to 120° F. At this temperature vigorous agitation with a high speed electric mixer was initiated, and the sample was allowed to cool without outside cooling means. This procedure was continued until the sample was brought to a temperature of 105° F. at which point the butter was packed into a glass jar. When packed the butter was a soft mass. The sample remained soft and within a few weeks oil began to separate from the sample. Four months later excessive oil had separated from the sample.

EXAMPLE VII

To 300 grams of finely ground peanut butter (98% less than 200 mesh) were added 3 grams of salt, 0.6 gram oil soluble butter flavor and 12 grams of the stabilizing composition described in Example I. The resultant mixture was heated to 150° F., mixed well, cooled to 120° F. At this point slight agitation as an aid to cooling was initiated and continued until the butter reached a temperature of 110° F. The sample was maintained at 110° F. and vigorously agitated with a high speed electric mixer until the mass was very soft. Agitation was discontinued and the sample was packed into a glass jar. Within a few weeks the sample had separated oil on the surface and four months later considerable oil had separated from the sample.

EXAMPLE VIII

To 600 grams of finely ground peanut butter (99% less than 200 mesh) were added 6 grams salt, 0.7 gram oil soluble butter flavor, and 42 grams of the stabilizing composition described in Example I. The resultant mixture was heated to 150° F., mixed well, cooled to 115° F. At 115° F. the mixture was agitated with a high speed electric mixer. It was then cooled quickly to 110° F. The mixture was agitated vigorously though butter was soft when packed, and then packed into a glass jar at 110° F. Within a few weeks oil had started separating from the sample and four months later a heavy layer of oil had separated on the top of the sample.

EXAMPLE IX

To 300 grams of finely ground peanut butter (less than 200 mesh) were added 3 grams of salt, and 15 grams of the stabilizing composition described in Example I. The resultant mixture was heated to 150° F., mixed well, and cooled to 120° F. At 120° F. fast but not vigorous agitation with an electric mixer was initiated. This agitation was continued while the butter cooled. The butter was then cooled rapidly to 110° F. and packed into a glass jar. This sample was soft when packed but was less soft than that described in Examples VII and VIII. Examination of this sample over a period of more than four months showed that it was soft, was characterized by excellent spreadability and that no oil separation had occurred.

The sample of Example VI contained approximately 3.0% hard stock, the sample of Example VII contained 2% hard stock, the sample of Example VIII contained 3.5% hard stock, and the sample of Example IX contained 2.5% hard stock.

Had the sample of Example IX been agitated vigorously at 110° F. instead of removing the sample immediately when it had reached 110° F. it would not have been stable to oil separation.

EXAMPLE X

To 800 grams of finely ground peanut butter were added 8 grams of salt, 1.6 grams of oil soluble butter flavor, and 48 grams of the stabilizing agent described in Example I. Thus 24 grams or an amount equal to about 3% of the weight of the nut butter treated of hydrogenated stabilizing agent were utilized.

The mixture so obtained was heated to a temperature of 150° F., mixed well, and cooled in a period of about 10 minutes to 130° F. At a temperature of 130° F. agitation was initiated and continued for a period of about 10 minutes until the butter reached a temperature of 120° F. The product was then immediately packed into a glass container.

Upon examination one week later the product was found to be hard and stiff, and to have poor spreading properties.

EXAMPLE XI

A commercial peanut butter was prepared by grinding peanuts in conventional equipment with hydrogenated peanut oil (iodine val. 8) stabilizer in an amount equal to 2%, 2.5% and 3% of the weight of the peanut butter. Salt in an amount equal to 1% of the weight of the nut butter and dextrose in an amount equal to 4% of the weight of the nut butter were incorporated in the hot grind. The peanut butter was ground until 95% passed 200 mesh. The temperature of the mixture leaving the grinding operation was about 175° F.

Line samples were removed and passed through a device which effected agitation and simultaneous cooling of the butter. The apparatus used is known as a Votator and is manufactured by the Girdler Corporation of Louisville, Kentucky. The data obtained are shown in Tables I to IV.

The peanut butter produced by the present process is compared with samples treated in the conventional manner, namely allowing stacked cases of the butter to cool slowly. A second commercial method was used in which the hot peanut butter was placed in jars in the regular manner, subjected to a cold air blast for the indicated time for partial cooling, and then stored.

In Table I 2% of hydrogenated peanut oil was used as the stabilizer. In Table II 2.5% of the same stabilizer was used. In Tables III and IV 3% of the hydrogenated peanut oil was added as a fluid suspension in peanut oil.

All of the samples were four weeks old when the data with respect to the physical characteristics thereof were determined.

the proper amount of hydrogenated fat added a good sample can be produced in the 100° F.–105° F. area because the beta formation temperatures

*Table I*

| Sample Number | 1 | 2 | 3 | 4 | 5 | 6 | 7 |
|---|---|---|---|---|---|---|---|
| Method | Regular | Cold air blast 10 min. at 25° F. | Votator | Votator | Votator | Votator | Votator. |
| Stabilizer | Hydrogenated Peanut Oil. Iodine No. 8. | | | | | | → |
| Stabilizer AI, percent | 2.0 | | | | | | → |
| Dextrose, percent | 4.0 | | | | | | → |
| Temp. in jar, °F | 180 | 148 | 100 | 105 | 110 | 115 | 119. |
| Votator Capacity, pounds per hour | | | 1,920 | 2,400 | 2,400 | 2,400 | 2,400. |
| Butter surface appearance | Fair, fat crystals visible. | High gloss, Moist. | High gloss, Moist. | Wet | Velvety, smooth. | Velvety, smooth. | Velvety, smooth. |
| Butter appearance under surface or consistency. | Coarse, crumbly when dug into. | Center good and smooth; Edges crumbly when dug into. | Soft | Soft | Grainy | Grainy | Grainy. |
| Spreadability | Poor, Firm | Fair, Firm | Good | Good | Good | Good | Slightly firm. |
| Stability | Good | Oil film on surface. | Oil film on surface. | Oil film on surface. | Good | Good | Good. |
| Taste | Fair | Fair | Good | Good | Good | Good | Good. |
| Palate adherence | Slight | Slight | None | None | None | None | Slight. |

The agitation and cooling in the Votator was carried out to bring the samples to the indicated temperatures. The approximate cooling time at 2400 pounds per hour is 1.5 minutes and at 870 pounds per hour was about 6 minutes.

It will be noted that the control samples Nos. 1 and 2 of Table I are of poor spreadability due to the method of cooling, the surface appearance of samples is poor, due to the fact that the butter was held at a high temperature and fat crystals crystallized on the surface as large crystals which are visible to the eye. The appearance of both samples 1 and 2 under the surface is bad. Both samples are crumbly and leave a rough surface as some of the butter is removed.

are a function of the relative quantities of hydrogenated and free unhydrogenated liquid oil.

Cooling of samples 3 and 4 to a lower temperature rapidly and agitating at a lower temperature would have resulted in improved samples.

Samples 5, 6 and 7 are far superior to the control samples, having good stability and spreadability, and while the samples have been scored as grainy in consistency, they present a pleasing appearance but are not as smooth as the preferred samples of my invention. Sample 7 is slightly film and the spreadability is affected. Hence the utilization of a temperature lower than 120° F. is indicated by this sample as being essential.

*Table II*

| Sample Number | 8 | 9 | 10 | 11 | 12 | 13 | 14 |
|---|---|---|---|---|---|---|---|
| Method | Regular | Cold Air blast 10 min. at 25° F. | Votator | Votator | Votator | Votator | Votator. |
| Stabilizer | Hydrogenated Peanut Oil, Iodine No. 8. | | | | | | → |
| Stabilizer AI, Per Cent | 2.5 | | | | | | → |
| Dextrose, Per Cent | 4.0 | | | | | | → |
| Temp. in jar, °F | 165 | 145 | 105 | 110 | 115 | 118 | 120. |
| Votator Capacity, pounds per hour | | | 1500 | 1500 | 1500 | 1500 | 1500. |
| Butter surface appearance | Fair, fat crystals on surface. | Velvety | Wet | High gloss, Moist. | High gloss, Moist. | Velvety, smooth. | Velvety, smooth. |
| Butter appearance under surface or consistency. | Dry, Grainy | Dry and Crumbly. | Soft | Soft | Soft | Grainy | Rough dry spots. |
| Spreadability | Dry and Firm | Dry and Firm | Good | Good | Good | Slightly firm. | Firm Spots. |
| Stability | Good | Good | Oil film on surface. | Oil film on surface. | Good | Good | Good. |
| Taste | Waxy | Waxy | Good | Good | Good | Good | Good. |
| Palate adherence | Slight | Slight | None | None | None | None | None. |

Samples 3 and 4 of Table I are soft and have shown oil separation. This is due to the fact that 2% hydrogenated oil has been used and with the addition of 2% stabilizer to the free or released oil heated in a common melt the hydrogenated fat beta crystallized over the temperature range of approximately 100° F. to 105° F. Therefore samples 3 and 4 were not cooled far enough below the beta formation area to produce a stable product.

It will be seen from later examples that with

The runs reported in Table II show a superiority for this process the same as do the runs recorded in Table I and again indicate that the required temperature range is below 120° F. Stabilizer in an amount equal to 2.5% of the weight of the butter was employed in the samples from which the data of Table II were derived, rather than 2% as in the samples from which the data of Table I were derived. As a result the temperature range at which the hydrogenated fat crystallizes in the beta form was raised to approximately 105° to 110°.

It will be noted that samples 10 and 11 have oil films on the surface while samples 12, 13 and 14 are stable to oil separation. Sample 12 while, however, stable to oil separation has a soft consistency which indicates that at the rate which it cooled and with the amount of stabilizer present it borders on the unstable area.

Had samples 12, 13 and 14 been cooled and agitated down into the range 105° to 110° F. as were samples 10 and 11 beta crystal formation would have been high and the alpha and beta prime nuclei would have been rapidly converted to beta crystals. A higher percentage of beta crystals would have formed and the samples would have been soft and not stable to oil separation. The formation of beta crystals is effected when the fat is cooled to and agitated in the beta formation area.

It is therefore apparent from the data of Table I and Table II that the peanut butter must be cooled and agitated to a temperature above that at which the hydrogenated fat crystallizes predominantly in the beta form, this will result in crystallization of the hydrogenated fat in the alpha and beta prime forms and as the product continues to cool at a slower rate without agitation and in the production of additional alpha and beta prime crystals in short chains.

Alternatively, as shown in Tables III and IV, the peanut butter may be cooled and agitated to a temperature below that at which the beta form of fat crystals is produced and the crystals milled or broken apart so that short chain interlacings are formed. The second alternative is preferred because superior spreadability results and less critical control is required.

Agitating and cooling to just above the beta formation area produces products much superior to those produced by conventional means as shown by control samples 1, 2, 8 and 9 compared to samples 5, 6, 7, 12, 13 and 14.

range of temperatures and in the preferred range of stabilizer concentration. Samples 17 and 18 were cooled rapidly well below the beta formation area and were agitated or milled at these temperatures to insure complete break down of the long chain interlacings, therefore, excellent spreadability resulted with excellent stability.

Sample 19 shows slight oil separation and is of a soft consistency. This shows that sample 19 was cooled to and agitated to within the beta formation area, therefore, formation of beta type crystals was high. Sample 20 while in approximately the same range as sample 19 and containing the same amount of stabilizing agent has excellent stability and spreadability. It will be noted that sample 20 was cooled almost three times as fast as sample 19 and that sample 19 was therefore agitated approximately three times as long in the beta formation area as was sample 20 thus it has a much higher beta formation from the longer agitation and slower rate of cooling before the cooling and agitating was stopped. Sample 20 was subjected to much more rapid temperature change and therefore tended to form more alpha and beta prime phase crystals, after cooling and agitation stopped, than did sample 19. Had sample 19 been cooled and agitated at the same rate as sample 20 it would have resulted in an excellent product.

Sample 21 of Table III demonstrated good stability and spreadability and was far superior to the control samples 15 and 16 showing that my process is superior to conventional methods whether the butter is processed below the beta formation area or above the beta formation area. While sample 21 was cooled at a rate slower than sample 20 it has good properties because it was cooled to near but above the beta formation area and while the fat was milled well with the butter to insure short chain interlacing the fat was in a non-crystalline form and the rate of cooling was

*Table III*

| Sample Number | 15 | 16 | 17 | 18 | 19 | 20 | 21 |
|---|---|---|---|---|---|---|---|
| Method | Regular | Cold air blast 45 min. at 15° F. | Votator | Votator | Votator | Votator | Votator. |
| Stabilizer | ⅓ Peanut Oil, ⅔ Hydrogenated Peanut Oil. | | | | | | → |
| Stabilizer AI, Per cent | 3.0 | | | | | | → |
| Dextrose, Per cent | None | | | | | | → |
| Temp. in jar, ° F | 160 | 106 | 74 | 82 | 105 | 106 | 115. |
| Votator Capacity, pounds per hour | | | 870 | 1,550 | 870 | 2,400 | 870. |
| Butter surface appearance | Fat flakes | Crack across top. | Smooth, Velvety. | Smooth, Velvety. | Wet | Smooth, Velvety. | Smooth, Velvety. |
| Butter appearance under surface or consistency. | Grainy and crumbly. | Smooth, Good. | Excellent, Creamy. | Excellent, Creamy. | Soft | Smooth, Good. | Smooth, Good. |
| Spreadability | Poor, Firm | Good, Smooth. | Excellent, smooth and creamy. | Excellent, smooth and creamy. | Good, Smooth but soft. | Good, Smooth. | Good, Smooth. |
| Stability | Good | Good | Good | Good | Oil film on surface. | Good | Good. |
| Taste | Waxy | Slight waxy | Excellent, "Nutty." | Excellent, "Nutty." | Good | Excellent, "Nutty." | Good. |
| Palate Adherence | Bad | Slight | None | None | None | None | None. |

The data in Table III obtained when using the special stabilizer in the proportion of 4.5% of the weight of the nut butter to obtain 3.0% hydrogenated oil again shows the superiority of my process. A peanut butter of excellent outstanding spreadability and stability was obtained at 74° F. and 82° F. as indicated by samples 17 and 18. The flavor of these butters was excellent and there was no adherence to the palate.

These samples were produced in the preferred not as critical as in sample 19 where the cooling was stopped in the beta formation area. Had sample 21 been cooled to 105° F.–110° F. it would have been soft and not stable to oil separation.

It will be noted that samples 11 and 12 of Table II are soft while samples 20 and 21 of Table III are good. This shows the effect of more rapid cooling in sample 20, and the effect of higher concentrations of stabilizer in sample 21 with a slower rate of cooling.

Table IV

| Sample Number | 22 | 23 | 24 | 25 |
|---|---|---|---|---|
| Method | Regular | Cold air blast, 10 min. at 20° F. | Votator | Votator. |
| Stabilizer | ½ Peanut Oil, ½ Hydrogenated Peanut Oil. | → | → | → |
| Stabilizer AI, percent | 3.0 | → | → | → |
| Dextrose, percent | 4.0 | → | → | → |
| Temp. in jar, °F | 148 | 135 | 72 | 87. |
| Votator capacity, pounds per hour | | | 870 | 870. |
| Butter surface appearance | Fair, Porous surface, Fat crystals on top. | Good | Velvety, Smooth | Velvety, Smooth. |
| Butter appearance under surface or consistency | Grainy and rough | Grainy | Excellent, creamy | Excellent, creamy. |
| Spreadability | Poor, Firm | Poor, Firm | Excellent, smooth and creamy | Excellent, smooth and creamy. |
| Stability | Good | Good | Good | Good. |
| Taste | Good | Good | Excellent | Excellent. |
| Palate adherence | Slight | Some | None | None. |

| Sample Number | 26 | 27 | 28 | 29 | 30 |
|---|---|---|---|---|---|
| Method | Votator | Votator | Votator | Votator | Votator. |
| Stabilizer | | | | | → |
| Stabilizer AI, percent | | | | | → |
| Dextrose, percent | | | | | → |
| Temp. in jar, °F | 104 | 105 | 110 | 115 | 120. |
| Votator capacity, pounds per hour | 2,400 | 870 | 870 | 870 | 870. |
| Butter surface appearance | Velvety, Smooth | High gloss | High gloss | Velvety, Smooth | Velvety, Smooth. |
| Butter appearance under surface or consistency | Excellent, creamy | Soft | Soft | Good, Smooth | Good, Smooth. |
| Spreadability | Excellent, smooth and creamy | Smooth but soft | Good, Smooth but soft | Good, Smooth | Good, Slightly firm. |
| Stability | Good | Oil film on surface | Good | Good | Good. |
| Taste | Excellent | Excellent | Good | Good | Good. |
| Palate adherence | None | None | None | None | None. |

Table IV further indicates that peanut butter produced in accordance with my invention by termination of agitation and rapid cooling at a temperature in the range of 105° F. to 120° F. is superior to butter produced by conventional methods but is inferior to that produced by termination of the agitation and rapid cooling at a temperature below 105° F. Sample 30 shows that 120° F. is near the top temperature requisite to the production of peanut butter of the desired quality. This is due to the fact that if the rapid cooling and agitation is stopped too far above the beta formation area the alpha and beta prime crystals formed will interlace into the long chain strong matrix and the sample while stable to oil separation will not have the desired spreadability. Sample 30 was slightly firm.

Samples 17 and 18 of Table III and samples 24 and 25 of Table IV were cooled rapidly and to a low temperature so that the fat crystals formed predominantly in the alpha phase and the conversion of the alpha crystals to beta prime crystals was almost instantaneous. The samples "set" from a soft semi-fluid mass to a semi-firm mass very quickly. Sample 26 was cooled rapidly to below the beta formation area and therefore the proportion of alpha crystals in this sample is high but it also contains more beta prime crystals than do the above samples.

The data in the tables indicate that temperatures below 120° F. are desirable in this process, that preferred samples are produced below 105° F. and further that the actual temperature requisite to optimum results is a function of the relative amount of stabilizer employed and the rate at which the product is rapidly cooled.

The following Examples XII to XXI illustrate the method for producing a peanut butter which has high shape retention but without substantial loss of spreadability. This modification of the process is particularly desirable since it makes it possible to market the peanut butter in a manner similar to that used for oleomargarine and dairy butter, namely in sticks or packages of a given shape which can be served at the table without loss of shape. It is noted that samples produced by this method retain spreadability properties even when refrigerated. They do not become hard and rubbery as conventional peanut butter does.

EXAMPLE XII

Eight hundred grams of finely ground peanut butter (95% less than 200 mesh), eight grams of salt, 1.6 grams of oil soluble butter flavor, and 48 grams of a stabilizing composition consisting of equal parts of hydrogenated and natural refined peanut oil were heated to a temperature of 160° F. and mixed well. The mixture thus contained hydrogenated peanut oil in an amount equal to 3% of the weight of the peanut butter.

The hot mixture so produced was transferred to a metal cooling pan wherein it formed a layer about ¾ inch deep and allowed to cool to 70° F. The cooled mixture was then agitated to destroy the interlacing of the crystals of hydrogenated peanut oil. The peanut butter which had been converted to a semi-fluid mass by the agitation was packed in four ounce containers. The containers and contents were then placed into a constant temperature oven and raised to a temperature of 100° F. The containers were then removed from the oven and permitted to cool to room temperature without further attention.

The peanut butter samples were found to have been converted from a semi-fluid state to a firm shape retentive state when removed from the oven at 100° F. The product so obtained was characterized by excellent spreadability and could be packaged in flexible wrappings.

EXAMPLE XIII

The procedure described in Example XII was repeated with the exception that the samples were reheated to a temperature of 115° F. instead of 100° F.

The product so obtained was very similar to that obtained in Example XII, although it was slightly less firm. The spreadability of the product of this example was excellent.

EXAMPLE XIV

The procedure of Example XII was repeated but the samples were reheated to 120° F. instead of 100° F.

The product so obtained was noticeably less firm than that resultant from the process of Example XII but the spreadability was unimpaired as compared with the product of Example XII.

EXAMPLE XV

The procedure of Example XII was repeated but the samples were reheated to 130° F. instead of 100° F.

The spreadability of the product of this example was good but inferior to that of the product of Example XII.

EXAMPLE XVI

The procedure of Example XII was repeated with the exception that 64 grams of the stabilizing composition were utilized in the formulation of the peanut butter. Thus there was present hydrogenated peanut oil in an amount equal to 4% of the weight of the peanut butter.

The product so obtained was found to be much more firm than the product of Example XII after reheating to 100° F., but was equivalent to the product of Example XII in spreadability.

EXAMPLE XVII

The procedure of Example XVI was repeated with the exception that the samples were reheated to 115° F. instead of 100° F.

The product so obtained was substantially identical with that of Example XVI in firmness and spreadability.

EXAMPLE XVIII

The procedure of Example XVI was repeated with the exception that the samples were reheated to 120° F. instead of 100° F.

The product so obtained was less firm than that of Example XVI but was shape retentive and characterized by excellent spreadability.

EXAMPLE XIX

The procedure of Example XVI was repeated with the exception that the samples were reheated to 130° F. instead of 100° F.

The product was noticeably less firm than that of Example XVI but was nevertheless shape retentive and characterized by excellent spreadability.

EXAMPLE XX

Three hundred grams of finely ground peanut butter (less than 200 mesh) 18 grams of the stabilizing agent described in Example XII, 3 grams of salt, and 0.3 gram of oil soluble synthetic butter flavor were heated to 160° F. and mixed well. The mixture was then poured into a cooling pan and cooled to 70° F.

After the mixture had cooled to a temperature of 70° F. it was thoroughly agitated to destroy the interlacing of hydrogenated peanut oil crystals. The soft mass resultant from the agitation was packed in 1" x 1" x 6" paper boats and heated in an oven to 110° F., at which point it was found that peanut butter had converted to a very firm product with excellent spreading properties. These characteristics were retained on cooling to room temperature.

EXAMPLE XXI

The procedure of Example XX was repeated with the exception that 24 grams of stabilizing composition were utilized. Thus there was present hydrogenated peanut oil in an amount equal to 4% of the weight of the peanut butter.

The product so obtained was more firm than that of Example XX but was characterized by equivalent spreading properties.

The following two examples illustrate that simple cooling of a nut butter composition from a temperature above the melting point of a hydrogenated fat stabilizing agent will not produce a shape retentive peanut butter having the desired properties of firmness and spreadability.

EXAMPLE XXII

Three hundred grams of finely ground peanut butter (less than 200 mesh), 3 grams of salt, 0.3 gram of oil soluble butter flavor, and 18 grams of the same stabilizing composition as that described in Example VIII were heated to a temperature of 160° F. and mixed well. The product so obtained was placed in 1" x 1" x 6" paper boats and cooled to room temperature.

The cooled nut butter which contained 3% by weight of hydrogenated fat stabilizing agent was not of the desired shape retention and the spreadability of this product was poor. It had a high degree of tenacity and was crumbly.

EXAMPLE XXIII

The procedure of Example XXII was repeated with the exception that 24 grams of stabilizing composition were employed. Thus there was utilized hydrogenated peanut oil in an amount equal to 4% of the weight of the nut butter.

The cooled product so obtained was simlar to that of Example XXII and demonstrated better shape retention but had very poor spreading properties. It was found to be dry and crumbly.

The following example shows that disruption of the hydrogenated fat crystal interlacings formed in the nut butter during the cooling thereof does not, without a subsequent reheating step produce a material having the desired properties.

EXAMPLE XXIV

Three hundred grams of finely ground peanut butter, 3 grams of salt, 0.4 gram of oil soluble butter flavor, and 27 grams of the stabilizing composition described in Example XII were heated to a temperature of 160° F., mixed well and cooled to a temperature of 70° F. The mixture was then agitated and placed in a container maintained at room temperature.

After agitating the product, which contained hydrogenated peanut oil in an amount equal to 4.5% of the weight of the nut butter, it did not have the desired shape retention.

The product of this example was not capable of retaining its configuration when allowed to stand unconfined and could not be packaged in flexible wrappings. It is desirable that the product assume a rigid and firm characteristic during the processing operation so that packaging and wrapping can be facilitated.

The following example demonstrates that reheating of a cooled nut butter containing a hydrogenated fat stabilizing agent without prior agitation of the cooled product will not yield a material having the desired properties.

EXAMPLE XXV

The procedure of Example XXIII was repeated with the exception that the cooled nut butter was reheated without agitation to a temperature of 110° F.

The butter was continuously observed as it was heated. It did not become firm after being maintained at 110° F. for three hours, but on the contrary the butter became mushy and remained so after cooling. The shape retention of the product was very poor.

The following example illustrates that agitation of the nut butter composition at high temperatures rather than agitation of the cooled nut butter followed by reheating does not produce the desired product.

EXAMPLE XXVI

One thousand grams of peanut butter, 10 grams of salt, 1 gram of oil soluble butter flavor, and 60 grams of the stabilizing composition described in Example XII were heated to 160° F., mixed well, cooled to 70° F., agitated vigorously, reheated to 110° F., and again agitated at that temperature. The mixture so produced was then packed into paper boats and cooled to 70° F.

Upon examination 24 hours later the product was found to have very poor shape retention. Reheating of the product to 110° F. did not improve the shape retention properties thereof, nor did maintaining the product at 110° F. for 3 hours.

I claim:

1. The process which comprises dispersing in nut butter a melted hydrogenated fat in an amount at least equal to from about 2% to about 5% by weight of the nut butter, rapidly and uniformly cooling the dispersion under conditions to obtain crystallization of the hydrogenated fat predominantly in alpha and beta prime forms, but in any event temperature below 120° F., and agitating the dispersion, and then storing the resultant butter at a temperature below the beta crystallization temperature.

2. The process of claim 1 wherein the nut butter is peanut butter.

3. The process of claim 1 wherein the hydrogenated fat is utilized in an amount at least equal to from about 2.25% to about 4% of the weight of the nut butter.

4. The process of claim 1 wherein the agitation is effected simultaneously with the cooling of the dispersion.

5. The process of claim 1 wherein the agitation is effected subsequent to the cooling of the dispersion.

6. The process of claim 1 wherein the dispersion is cooled rapidly to a temperature within the range of from about 65° F. to about 100° F.

7. The process of claim 1 wherein the temperature to which the butter is cooled is about 90° F. to about 100° F.

8. The process of claim 1 wherein the temperature to which the butter is cooled is about 115° F. to about 120° F.

9. The process which comprises dispersing in hot peanut butter an edible oil soluble butter flavor and a stabilizing composition then simultaneously agitating and rapidly cooling the mixture to a temperature within the range of from about 65° F. to about 100° F., said stabilizing composition consisting essentially of about 30 to about 70 parts of natural refined and about 70 to about 30 parts hydrogenated peanut oil, and being utilized in an amount sufficient to provide hydrogenated peanut oil in a quantity equal to at least from about 1.5% to about 6% of the weight of the nut butter.

10. The process which comprises dispersing in a hot nut butter a melted hydrogenated fat in an amount at least equal to about 3% to about 6% by weight of the nut butter, rapidly cooling the dispersion to a temperature below about 120° F. under conditions such that the hydrogenated fat is crystallized predominantly in the alpha and beta prime forms, and then agitating the cooled mixture.

11. The process of claim 10 wherein the nut butter is peanut butter.

12. The process which comprises dispersing in hot peanut butter an oil soluble butter flavor and a stabilizing agent, rapidly cooling the mixture to a temperature within the range of from about 65° F. to about 90° F., and agitating the cooled mixture, said stabilizing composition consisting essentially of hydrogenated and refined natural peanut oil, and being utilized in such an amount that there is provided hydrogenated peanut oil at least equal to from about 3% to about 6% of the weight of the nut butter, then warming the nut butter to about 100° F. to about 110° F. until it assumes shape retaining consistency, and then cooling it below 100° F.

13. The product resultant from the process of claim 1.

14. The product resultant from the process of claim 1 the product being found characterized in that the nut butter is peanut butter.

15. The product resultant from the process of claim 9.

16. The product resultant from the process of claim 12.

17. The process which comprises dispersing in nut butter a melted hydrogenated fat in an amount at least equal to from about 2% to about 5% by weight of the nut butter, rapidly cooling the dispersion so formed to a temperature below about 120° F. but slightly above that at which the hydrogenated fat crystallizes predominantly in the beta form, and agitating the dispersion to mill the fat with the nut butter.

18. The product resultant from the process of claim 17.

19. The process which comprises dispersing in nut butter a melted hydrogenated fat in an amount at least equal to from about 2% to about 5% by weight of the nut butter, rapidly cooling the dispersion so formed to a temperature below about 105° F. such that at which the hydrogenated fat crystallizes predominantly in the beta form, and agitating the dispersion to reduce interlacing of the crystals of the hydrogenated fat.

20. The process which comprises dispersing in nut butter a melted hydrogenated fat in an amount at least equal to from about 2% to about 5% by weight of the nut butter, rapidly cooling the dispersion to a temperature within the range of 60° F. to 120° F. selected to obtain crystallization of the hydrogenated fat predominantly in the alpha and beta prime forms.

21. A process which comprises uniformly mixing a hydrogenated fat stabilizer readily crystallizable in the beta crystalline form with a nut butter at a temperature above the melting point of said stabilizer, rapidly and uniformly cooling the mixture to a temperature below about 120° F. under conditions at which the stabilizer is obtained in a crystalline form predominantly other than the beta form, the temperature of predominant beta crystal formation being in the range of about 100° to 110° F., said beta formation temperature increasing as the proportion of stabilizer to free oil in the dispersion is increased, the proportion of stabilizer to nut butter being in the range of about 2 to about 6% by weight, said dispersion being agitated at any stage after being cooled below 120° F., to obtain a semifluid composition, and then placing the composition thus formed in containers while still semifluid.

PAUL J. MITCHELL, JR.

REFERENCES CITED

The following references are of record in the file of this patent:

UNITED STATES PATENTS

| Number | Name | Date |
|---|---|---|
| 1,395,934 | Stockton | Nov. 1, 1921 |
| 1,445,174 | Rosenfield | Feb. 13, 1923 |